? United States Patent (12) United States Patent
Lundman (10) Patent No.: US 11,156,319 B2
(45) Date of Patent: Oct. 26, 2021

(54) FLOW RESTRICTION SYSTEM (71) Applicant: Philip L. Lundman, Fredonia, WI (US)

(72) Inventor: Philip L. Lundman, Fredonia, WI (US)

( * ) Notice: Subject to any disclaimer, the term of this patent is extended or adjusted under 35 U.S.C. 154(b) by 106 days.

(21) Appl. No.: 16/452,710

(22) Filed: Jun. 26, 2019

(65) Prior Publication Data

US 2020/0003352 A1 Jan. 2, 2020

Related U.S. Application Data

(60) Provisional application No. 62/690,395, filed on Jun. 27, 2018.

(51) Int. Cl.
| | |
|---|---|
| *F16L 55/11* | (2006.01) |
| *F16L 55/134* | (2006.01) |
| *F16L 55/124* | (2006.01) |
| *F16K 7/10* | (2006.01) |

(52) U.S. Cl.
CPC ............ *F16L 55/1141* (2013.01); *F16K 7/10* (2013.01); *F16L 55/124* (2013.01); *F16L 55/134* (2013.01)

(58) Field of Classification Search
CPC ... F16L 55/134; F16L 55/124; F16L 55/1141; F16K 7/10
See application file for complete search history.

(56) References Cited

U.S. PATENT DOCUMENTS

| | | | |
|---|---|---|---|
| 5,778,919 A | 7/1998 | Petrone | |
| 5,934,311 A * | 8/1999 | Brown | G02B 6/502 |
| | | | 137/240 |
| 7,588,053 B2 | 9/2009 | Lundman | |
| 8,636,035 B2 | 1/2014 | Lundman | |
| 8,936,045 B2 | 1/2015 | Lundman | |
| 2008/0072981 A1* | 3/2008 | Saffell | F16L 55/134 |
| | | | 138/90 |
| 2008/0163951 A1* | 7/2008 | Lundman | F16L 55/44 |
| | | | 138/93 |
| 2010/0206394 A1* | 8/2010 | Song | F16L 55/124 |
| | | | 137/315.01 |
| 2013/0048130 A1* | 2/2013 | Lundman | F16L 55/1141 |
| | | | 138/93 |

* cited by examiner

*Primary Examiner* — Atif H Chaudry
(74) *Attorney, Agent, or Firm* — Michael Best & Friedrich LLP (57) ABSTRACT

A flow restriction system for restricting fluid flow through a pipe includes an anchor and an inflatable plug. The anchor includes an alignment body, a shield body, and a first fluid passage defined in the alignment body and the shield body. The shield body extends from the alignment body and has an upstream face and a downstream face. The downstream face is opposite the upstream face. The shield body is configured to block at least a portion of the fluid flow through the pipe. The inflatable plug is coupled to the downstream face of the shield body. The inflatable plug includes an interior chamber that is in fluid communication with the first fluid passage.

19 Claims, 8 Drawing Sheets

FLOW RESTRICTION SYSTEM

CROSS-REFERENCE TO RELATED APPLICATIONS

This application claims priority to U.S. Provisional Patent Application No. 62/690,395, filed Jun. 27, 2018, the entire contents of which are incorporated by reference herein.

TECHNICAL FIELD

The present disclosure generally pertains to plugs for conduits.

BACKGROUND

The present disclosure relates to a flow restriction system, or pipe sealing apparatus, that is insertable into pipelines of varying diameters and is inflatable therein to seal a section of pipeline. Such a pipe sealing apparatus is sometimes referred to as an Inflatable Line Stop plugging system.

Inflatable plugs provide a useful means to mitigate the uncontrolled release of fluids from a pipeline when a break occurs in the pipeline or when downstream repairs are required. Inflatable plugs are also used for plugging conduits, such as sewer lines, gas lines, or oil pipelines, to permit maintenance, facilitate toxic waste containment, or remove blockages. Such plugs couple to fluid lines to facilitate inflation and deflation within conduits.

SUMMARY

In one embodiment, the disclosure provides a flow restriction system for restricting fluid flow through a pipe. The flow restriction system includes an anchor and an inflatable plug. The anchor includes an alignment body, a shield body, and a first fluid passage defined in the alignment body and the shield body. The shield body extends from the alignment body and has an upstream face and a downstream face. The downstream face is opposite the upstream face. The shield body is configured to block at least a portion of the fluid flow through the pipe. The inflatable plug is coupled to the downstream face of the shield body. The inflatable plug includes an interior chamber that is in fluid communication with the first fluid passage.

In another embodiment, the disclosure provides a method of restricting fluid flow through a pipe. The method includes inserting a shield body of an anchor into the pipe, thereby producing a pressure differential in the fluid flow through the pipe. The method also includes inflating an inflatable plug connected to the anchor downstream from the shield body to seal the pipe.

Other aspects of the disclosure will become apparent by consideration of the detailed description and the accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
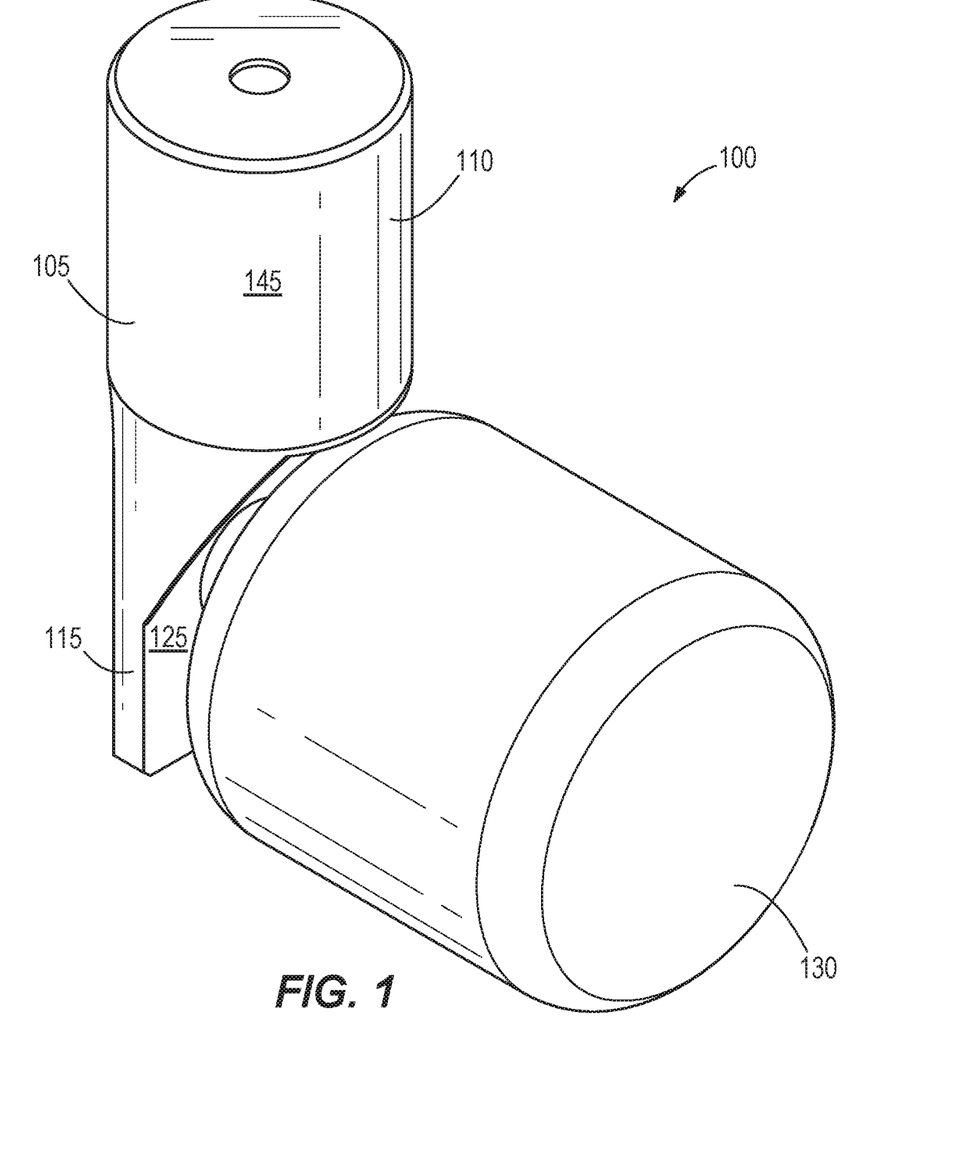
FIG. 1 is a perspective view of an embodiment of a fluid restriction system.
Figure 2:
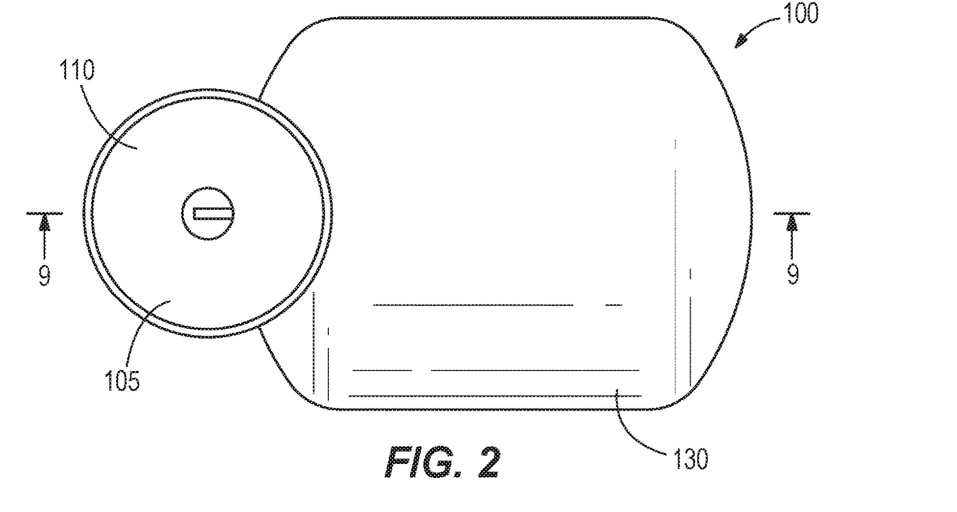
FIG. 2 is a top plan view of the fluid restriction system of FIG. 1.

Turning now to FIG. 1, a flow restriction system 100 is shown. The flow restriction system 100 includes an anchor 105. The anchor 105 includes an alignment body 110 and a shield body 115. The shield body 115 extends from the alignment body 110. In some embodiments, the shield body 115 is connected directly to the alignment body 110, as shown in the figures. In other embodiments, however, one or more intermediate components may connect the shield body 115 to the alignment body 110.

Figure 3:
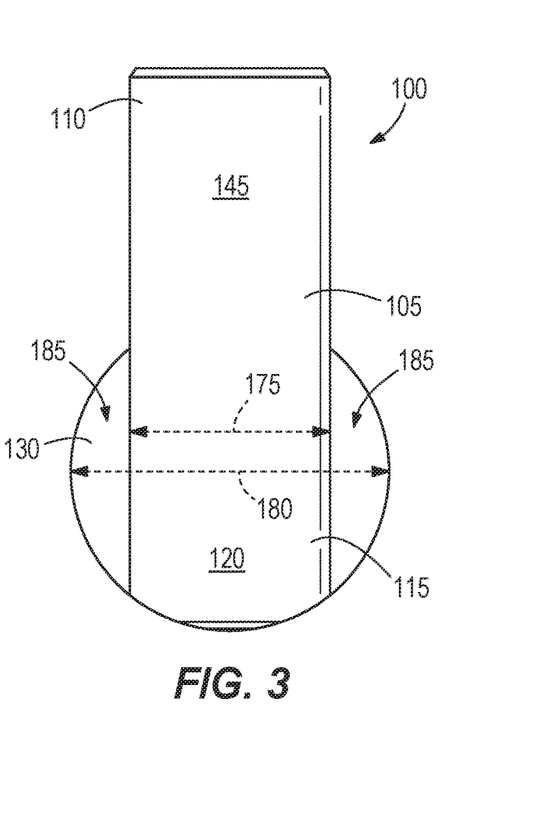
FIG. 3 is a front elevation view of the fluid restriction system of FIG. 1
Figure 4:
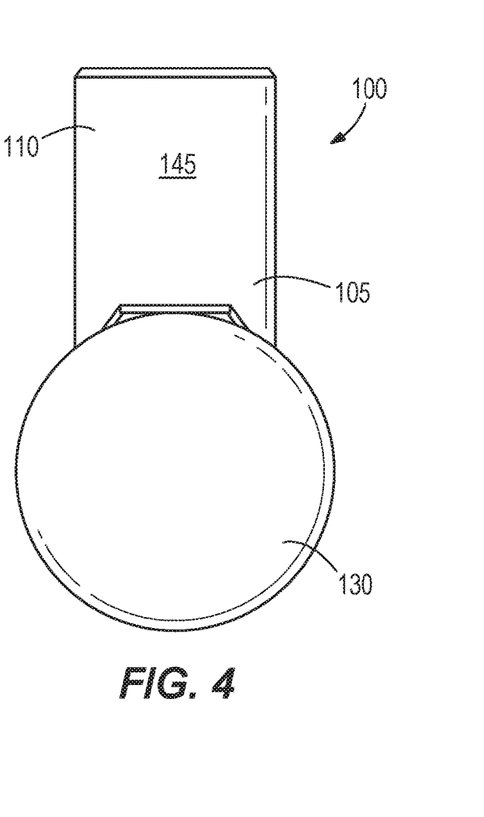
FIG. 4 is a rear elevation view of the fluid restriction system of FIG. 1.
Figure 5:
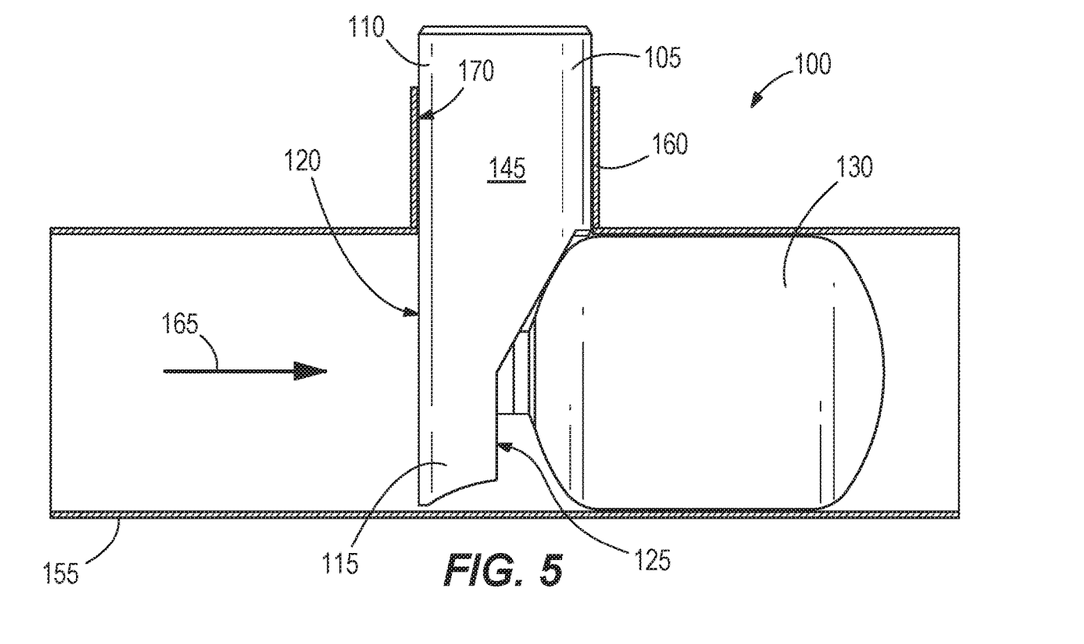
FIG. 5 is a side elevation view of the fluid restriction system of FIG. 1 while placed inside a pipe with an inflatable plug in an inflated state.

As can best be seen in FIGS. 1, 3, and 5, the shield body 115 includes an upstream face 120 and a downstream face 125. The downstream face 125 is opposite the upstream face 120. These face names are to be interpreted as identifiers only, and are not meant to be limiting. Some embodiments, however, include the upstream face 120 being different from the downstream face 125 such that a particular orientation of the shield body 115 placed in the pipe is preferred. One example of such an embodiment includes a curved upstream face 120 as shown in the figures. The downstream face 125 may also be curved, but in the illustrated embodiments, it is flat or planar.

Figure 9:
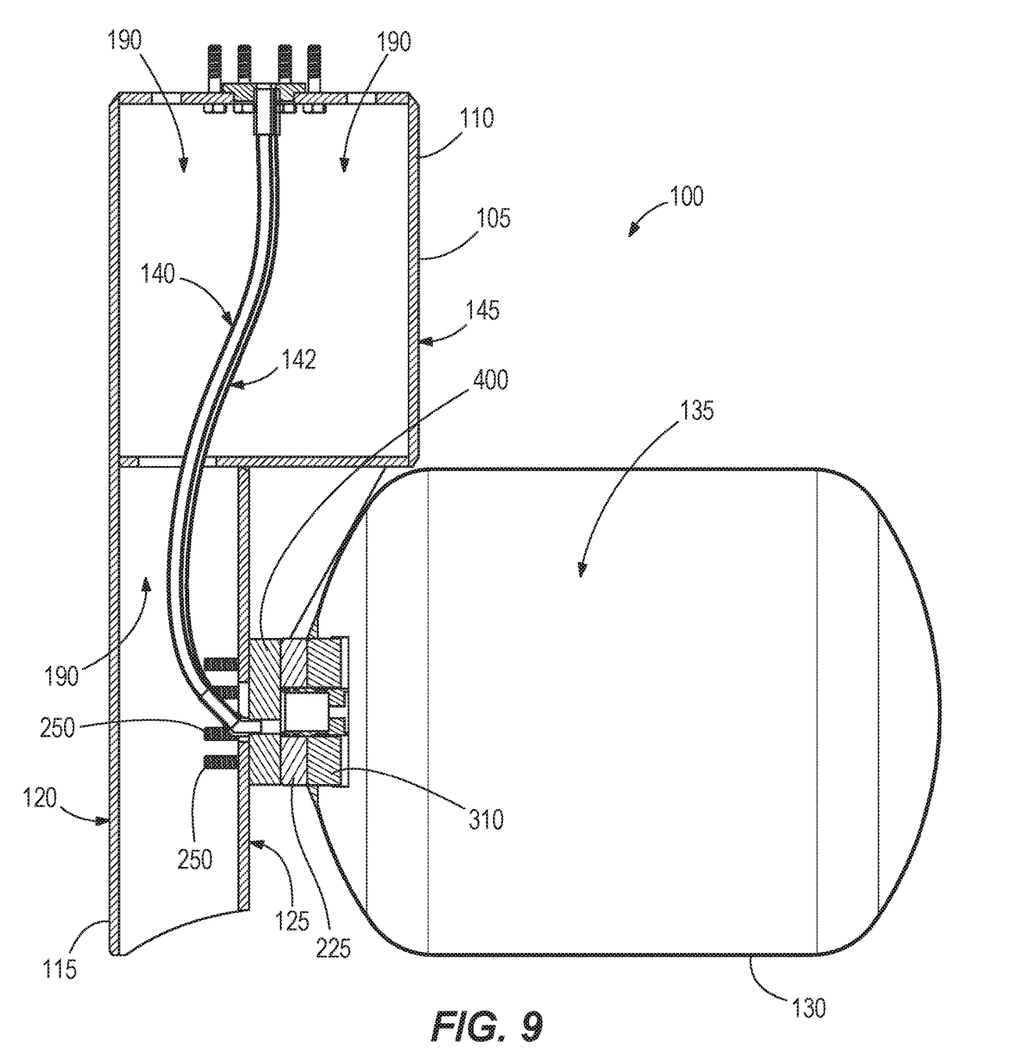
FIG. 9 is a cross-sectional side elevation view of the fluid restriction system of FIG. 1.

The flow restriction system 100 also includes an inflatable plug 130. The inflatable plug 130 is shown in an uninflated state in FIG. 6 and is shown in an inflated state in FIG. 5. As shown in FIG. 9, the inflatable plug 130 includes an interior chamber 135. The inflatable plug 130 is also coupled to the downstream face 125 of the shield body 115. Some configurations of the downstream face 125, including providing a flat part on the downstream face 125 or a completely flat downstream face, may facilitate this coupling.

Figure 10:
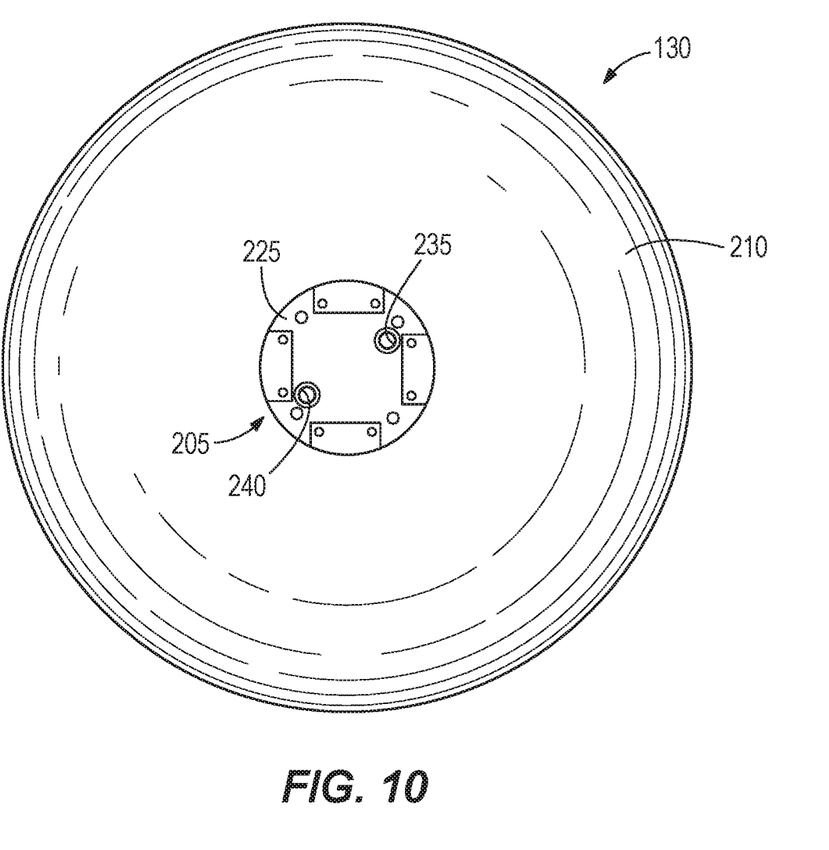
FIG. 10 is a front elevation view of the inflatable plug of the fluid restriction system of FIG. 1.
Figure 11:
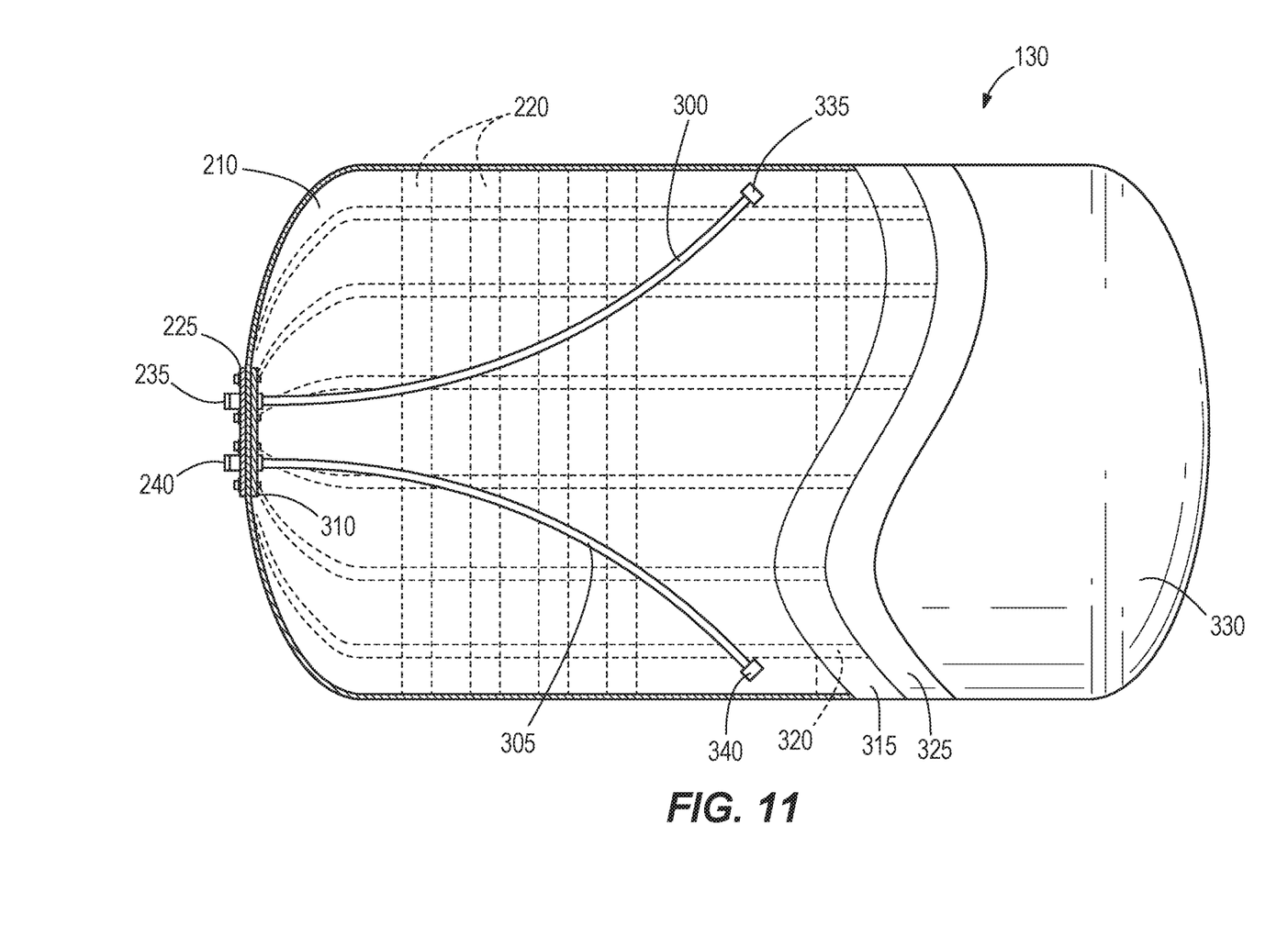
FIG. 11 is a partial cross-section side elevation view of the inflatable plug of FIG. 10.
Figure 12:
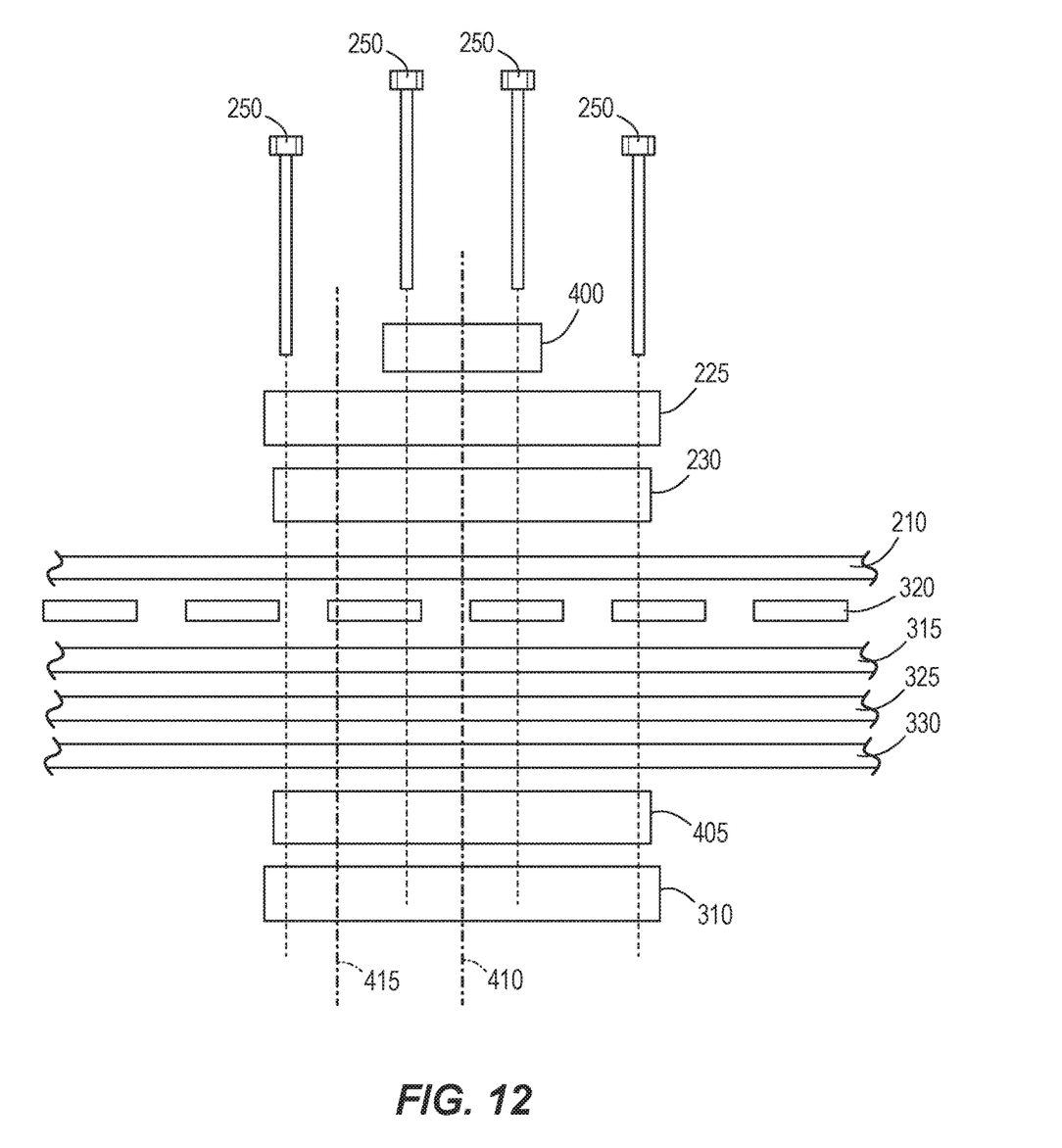
FIG. 12 is an exploded cross-sectional side view of a portion of the inflatable plug of FIG. 10.

FIG. 10 shows a front elevation view of an inflatable plug 130 having a plate assembly 205 according to an embodiment of the disclosure. As shown in FIGS. 11 and 12, the plug 130 is generally cylindrical and includes an inner bladder 330, a plurality of fabric layers 210, 315, 325, and a plurality of straps 220. In the illustrated embodiment, the plug 130 includes eight straps 220 spaced apart and positioned adjacent an outermost fabric layer 210. As shown in FIG. 11, the straps 220 are positioned on an exterior surface of the outermost fabric layer 210; however, in other embodiments, the straps 220 may be positioned between the outermost fabric layer 210 and an inner fabric layer 315. The straps 220 circumferentially surround the plug 130 and increase the sealing capabilities of the plug. The straps 220 may be constructed of, for example, low durometer butyl rubber, Buna-N rubber, or ballistic nylon. In some embodiments, the straps 220 may have a relatively high coefficient of friction to resist sliding of the inflated plug 130 within the conduit 155. In other embodiments, the inflatable plug 130 may be constructed of other materials, layers, and/or straps.

The plate assembly 205 is positioned on an end of the plug 130 and includes an outer plate 225 and an inner plate 310 (see FIG. 11) coupled to the outer plate 225 via fasteners 250 (e.g., bolts, screws, rivets, nails, etc.). The outer plate 225 is positioned outside of the bladder 330, while the inner plate 310 is positioned inside the bladder 330. With such an arrangement, the fabric layers 210, 315, 325 and the bladder 330 are captured or sandwiched between the plates 225, 310. The fasteners 250 are positioned along a circumference of the outer plate 225 and extend through the outer plate 225, through the fabric layers 210, 315, 325 and the bladder 330, to the inner plate 310. In the illustrated embodiment, the outer and inner plates 225, 310 are circular in shape and positioned such that the inner plate 310 is aligned with the outer plate 225. In other embodiments, the outer and inner plates 225, 310 may be other shapes (e.g., square, octagonal, etc.), and/or may not be aligned with each other.

In some embodiments, the plate assembly 205 includes a first fluid port 235 and a second fluid port 240 (see FIGS. 10 and 11). The first fluid port 235 may also be a pressure monitoring port. In some embodiments, the first fluid port 235 is positioned near an edge of the plate assembly 205, and the second fluid port 240 is positioned in the center of the plate assembly 205. In other embodiments, the positions of the ports 235, 240 may be exchanged or the positions may be modified to other suitable locations on the plate assembly 205. In the illustrated embodiment, the first fluid port 235 and the second fluid port 240 are both off-center on the plate assembly 205 and spaced apart from each other. Additionally, or alternatively, fewer or more ports may be provided to allow fluid flow or to support additional internal or external instrumentation (e.g., sensors, transducers, detectors, etc.) for plug monitoring.

The first fluid port 235 can also be considered an air flow port, which provides fluid access to an interior region of the plug 130. In the embodiment illustrated in FIGS. 10 and 11, the first fluid port 235 is defined by the outer plate 225 and the inner plate 310. Air, nitrogen, or other gases flow through the first fluid port 235 to inflate and deflate the plug 130. In some embodiments, the first fluid port 235 may include a ball valve with a quick connect/disconnect coupling to facilitate connection of an air hose to the first fluid port 235.

In some embodiments, air, or some other gas, is used to initially inflate the plug 130 when the plug is being positioned in a pipeline not filled with a liquid. If the pipeline is filled with a liquid, the plug may be filled with a liquid of a similar specific weight. As such, the position of the plug 130 may be adjusted more easily within the conduit 155. Water (or some other liquid) may be then injected into the plug 130 through the second fluid port 240 after air inflation, exhausting the air through the first fluid port 235 and reducing potential shifting of the plug within the conduit 155.

As shown in FIG. 12, a cushion 230 (e.g., a ballistic strength nylon material or Kevlar® cushion or other suitable cushion) is positioned between the outermost fabric layer 210 and the outer plate 225. The cushion 230 is generally a shape similar to the outer plate 225. During assembly of the outer plate 225 on the plug 130, the cushion 230 compresses and deforms and may extend slightly past an edge of the outer plate 225. In some embodiments, a second cushion 405 is positioned between the bladder 330 and the inner plate 310. The cushions 230, 405 prevent the outer and inner plates 225, 310 from creating stress lines or tears in the bladder 330 and the fabric layers 210, 315, 325.

FIG. 11 shows a partial cross-sectional view of the plug 130. In the illustrated embodiment, the plug 130 includes the bladder 330, two inner fabric layers 315, 325, a webbing 320, and the outermost fabric layer 210. The bladder 330 is the innermost layer and defines the interior region of the plug 130. The fabric layers 210, 315, 325 surround and enclose the bladder 330, protecting the bladder 330 from puncturing or tearing and determining the pressure capacity of the plug. The bladder 330 may be constructed of, for example, a polyurethane or other impermeable material; the inner fabric layers 315, 325 may be constructed of a ballistic strength nylon material or Kevlar® (available from DuPont Advanced Fiber Systems of Richmond, Va.); and the outermost fabric layer 210 may be constructed of a ballistic strength nitrile-coated nylon material or some other material, depending on specific chemical and temperature requirements.

The webbing 320 (which may also be constructed of a ballistic strength nylon material or Kevlar®) is positioned between one of the inner fabric layers 315 and the outermost fabric layer 210 to increase the strength of the plug 130. The webbing 320 extends circumferentially and lengthwise along the plug 130, culminating at each end of the plug. In some embodiments, a fabric patch (e.g., a webbing material) may be positioned at each end of the plug 130 such that the webbing 320 may couple to the fabric patch. Additionally, or alternatively, more or fewer fabric layers 210, 315, 325 and/or webbings 320 may be used to adjust the strength of the plug 130.

As shown in FIG. 11, a first fluid tube 300 extends from the first fluid port 235 into the plug 130, and a second fluid tube 305 extends from the second fluid port 240 into the plug 130. The first fluid tube 300 may include a float 335 coupled to an end opposite the first fluid port 235, such that the end of the first fluid tube 300 floats on any liquid present in the bladder 330 and allows for exhausting the air from the bladder 330 as the bladder 330 is filled with a liquid. The second fluid tube 305 may include a weight 340 coupled to an end opposite from the second fluid port 240, such that the end of the second fluid tube 305 sinks in any liquid present in the bladder 330 and allows for removal of the liquid from a bottom of the bladder 330. Additionally, the either the first fluid tube 300 or the second fluid tube 305 may include a pressure gauge to measure the inflation pressure of the plug 130.

FIG. 12 shows an exploded side view of a portion of the plug 130. Assembly of the plug 130 is performed by positioning the bladder 330 over the inner plate 310 and the second cushion 405. The bladder 330 is covered with the one or more inner fabric layers 315, 325, and at times the webbing 320, and the outermost fabric layer 210. The outer plate 225 and the cushion 230 are positioned on the outermost fabric layer 210, aligned with the bottom plate 310 and the second cushion 405.

The fasteners 250 pass through the outer plate 225, the cushions 230, 405, the fabric layers 210, 315, 325, the bladder 330, and the inner plate 310 to couple the outer plate 225 and the inner plate 310. The fasteners 250 are tightened (e.g., torqued) to compress the bladder 330, cushions 230, 405 and the fabric layers 210, 315, 325.

The first fluid port 235 and the second fluid port 240 are also provided through the outer plate 225, the cushions 230, 405, the fabric layers 210, 315, 325, the bladder 330, and the inner plate 310 to allow fluid communication between an exterior of the plug 130 and the interior region. In the embodiment illustrated in FIG. 12, the first fluid port 235 is provided generally at line 415, and the second fluid port 240 is provided generally at line 410. In some embodiments, instrumentation and/or fittings, such as ball valves, may be inserted through the plug layers to define the first fluid port 235 and the second fluid port 240.

Fasteners 250 pass through the spacer 400, the top plate 225, the cushions 230, 405, the fabric layers 210, 315, 325, the bladder 330, and the bottom plate 310 to couple the passages 140, 142 to the plate assembly 205. As discussed above, the fasteners 250 may be tightened to further compress the bladder 330, cushions 230, 405 and the fabric layers 210, 315, 325. Some embodiments include at least one spacer 400, while others do not.

In some embodiments, the bladder 330, the fabric layers 210, 315, 325, and the cushions 230, 405 may include prior-made slits or cut-outs to facilitate passing of the fasteners 250 and/or fittings defining the first fluid port 235 and the second fluid port 240 through the outer plate 225 and the inner plate 310.

After the plate assembly 205 is secured, edges of the bladder 330 are joined together (e.g., radio-frequency welded) to form a closed bladder. Likewise, edges of the fabric layers 210, 315, 325 are sewn and/or RF welded together to surround the bladder 330 to form the plug 130. A sealant (e.g., silicone, polyurethane gel, etc.) is applied to seams formed during sewing to help prevent fluid leakage therethrough. In some embodiments, single pieces of the bladder 330 and the fabric layers 210, 315, 325 are used to form the plug 130. In other embodiments, multiple pieces of bladder material and/or fabric material are sewn together to form the plug 130. In addition, multiple stitches may be used to increase the strength of the plug 130.

Turning now particularly to FIG. 9, a first fluid passage 140 and a second fluid passage 142 are defined in the alignment body 110 and the shield body 115. In some embodiments, each of the first and second fluid passages 140, 142 include a pipe or tube passing through the anchor 105. In such embodiments, the anchor 105 may be generally hollow as shown in FIG. 9. In the illustrated embodiment, each of the first fluid passage pipe 140 and the second fluid passage pipe 142 is connected at a top end of the alignment body 110 and also at the downstream face 125 of the shield body 115. Both the first fluid passage 140 and the second fluid passage 142 are in fluid communication with the interior chamber 135 of the inflatable plug 130. The first fluid passage 140 is connected to the first fluid port 235 (FIGS. 10-11) of the plug 130. Likewise, the second fluid passage 142 is connected to the second fluid port 240 of the plug 130. Many embodiments include at least one of the first fluid passage 140 and the second fluid passage 142 in selective fluid communication with the interior chamber 135 of the inflatable plug 130.

Figure 6:
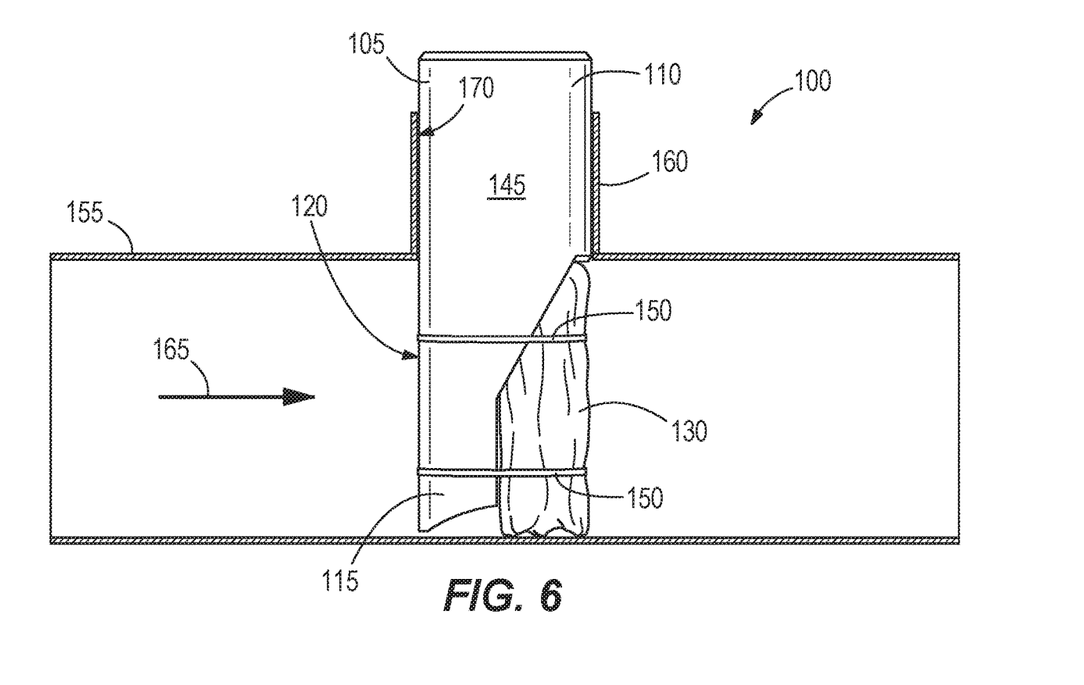
FIG. 6 is a side elevation view of the fluid restriction system of FIG. 1 while placed inside a pipe with the inflatable plug in an uninflated state.

As shown in FIG. 6, the inflatable plug 130 may be in an uninflated state. This uninflated state may include the shield body 115 and the inflatable plug 130 generally fitting within a footprint of the alignment body 110. The footprint of the alignment body 110 can be defined by the peripheral surface 145 of the alignment body. Stated another way, the uninflated inflatable plug 130 and the shield body 115 may be substantially under the alignment body 110.

The inflatable plug 130 is inflated from the uninflated state shown in FIG. 6 to the inflated state shown in FIG. 5 by adding a first fluid to the interior chamber 135 via the first fluid passage 140. This fluid may be a gas, a liquid, a slurry, or the like. The first fluid passage 140 is also configured to carry the first fluid out of the interior chamber 135. A second fluid having a density that is higher than the first fluid is added to the interior chamber 135 via the second fluid passage 142. This fluid may be a gas, a liquid, a slurry, or the like. The second fluid passage 142 is also configured to carry the second fluid out of the interior chamber 135. In one embodiment, the first fluid is a gas and the second fluid is a liquid. Alternatively, the second fluid passage 142 may be a pressure line to measure a pressure within the inflatable plug 130.

Turning now to FIG. 6, in order to keep the inflatable plug 130 in place for shipping, storage, or for ease of installation when using the flow restriction system 100 in the field, the inflatable plug 130 may be held close to the shield body 115 with one or more bands 150 or other appropriate straps. Bands 150 may be rubber bands, for instance. In some embodiments, the bands 150 may be omitted. As the inflatable plug 130 is inflated into the inflated state (FIG. 5), the inflatable plug 130 expands outwardly and breaks the bands 150. In some embodiments, the bands 150 may be designed to roll up and/or off of the inflatable plug 130 rather than break.

Figure 7:
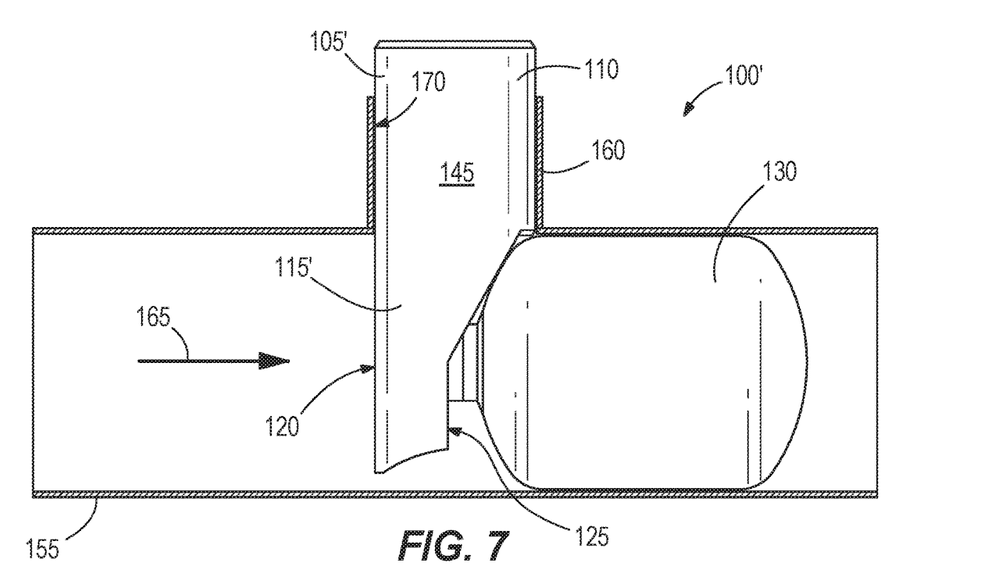
FIG. 7 is a side elevation view of a second embodiment of a fluid restriction system.

With particular reference to FIGS. 5-7, a pipe, or conduit, 155 is shown. The pipe 155 can be any appropriate pipe to be serviced or repaired. The pipe 155 may be, for example, a sewer line, a water main, an oil pipeline, a gas line, or any other conduit suitable for transporting fluids. A hot tap may be located or installed on the pipe 155. A pipe branch, nozzle, or hot tap sleeve 160 is configured to couple to the pipe 155 or already is coupled to the pipe 155 at the hot tap. The hot tap sleeve 160 may be bolted or welded to the pipe 155 in many embodiments. A tapping valve (not shown) may be coupled to the hot tap sleeve 160 to allow selective access into the pipe 155 through the hot tap. A Bypass Tee may also be attached to the tapping valve to allow flow to continue past the plugged pipeline section. The flow restriction system 100 is at least partially insertable into the pipe 155 through the hot tap sleeve 160 to restrict fluid flow 165 through the pipe 155. In some embodiments, a launch cylinder (not shown) may be coupled to the hot tap sleeve 160 to help guide and direct the flow restriction system 100 into the pipe 155. Restricting fluid flow 165 through the pipe 155 permits maintenance and/or repairs to be performed on the pipe or other related structures. The shield body 115 is insertable into the pipe 155 with the inflatable plug 130 via the hot tap such that the shield body 115 and the inflatable plug 130 are both received within an inner periphery of the pipe. By fitting the plug 130 while in the uninflated state within the footprint of the alignment body 110, the anchor 105 and inflatable plug 130 are together insertable through the hot tap sleeve 160 to move the shield body 115 and the inflatable plug 130 into the pipe 155 as shown in FIG. 6. The hot tap sleeve 160 includes a sleeve inner wall surface 170, and the peripheral surface 145 of the alignment body 110 is generally parallel to the sleeve inner wall surface in order to properly align and/or center the anchor 105 for insertion into the pipe 155. In the illustrated embodiments, the alignment body 110 is generally cylindrical, although other suitable shapes may alternatively be employed.

In some embodiments, the shield body 115 is configured to block at least a portion of the fluid flow 165 through the pipe 155. It is contemplated in this disclosure that the shield body 115 may allow at least some of the fluid flow 165 to pass by instead of completely blocking the fluid flow in the pipe 155. In such embodiments, as best shown in FIG. 3, the shield body 115 has a shield body width 175 that is configured to extend perpendicularly to the lengthwise direction of the pipe 155 when the shield body 115 is located in the pipe 155. The inflatable plug 130 has a plug diameter 180 that also is configured to extend perpendicularly to the lengthwise direction of the pipe 155 when the inflatable plug 130 is in the inflated state and is located in the pipe 155. Many embodiments include the shield body width 175 being shorter than the plug diameter 180 to define one or more gaps 185 between the wall of the pipe 155 and the shield body 115.

In some embodiments of a flow restriction system 100', such as that shown in FIG. 7, the shield body 115' of the anchor 105' may be purposely manufactured to be too short lengthwise for the end of the shield body 115' to reach the bottom of the pipe 155. In such an embodiment, the sides as well as the bottom around the shield body 115' form one continuous gap 185. In other embodiments, the shield body 115 may extend to the bottom of the pipe 155, and the bottom edge of the shield body may even be curved to closely follow the interior surface of the pipe wall.

The shield body 115 may include recesses, indentations, grooves, holes, notches, and the like to direct or control the fluid flow 165. In still further embodiments, the shield body 115 may include one or more gates (not shown) configured to be selectively opened or closed to allow a recess, indentation, groove, hole, notch, and the like to open and allow fluid flow 165 to pass therethrough. The shield body 115, thereby, blocks or diverts fluid flow 165 around the inflatable plug 130 to facilitate inflation of the plug. In some embodiments, such as that shown in FIG. 9, the bottom of the shield body 115 (which may also be called the end of the shield body or an end of the shield body opposite the alignment body 110) is open to allow fluid flow 165 into the anchor 105 and through the fluid flow bypass passage 190.

Figure 8:
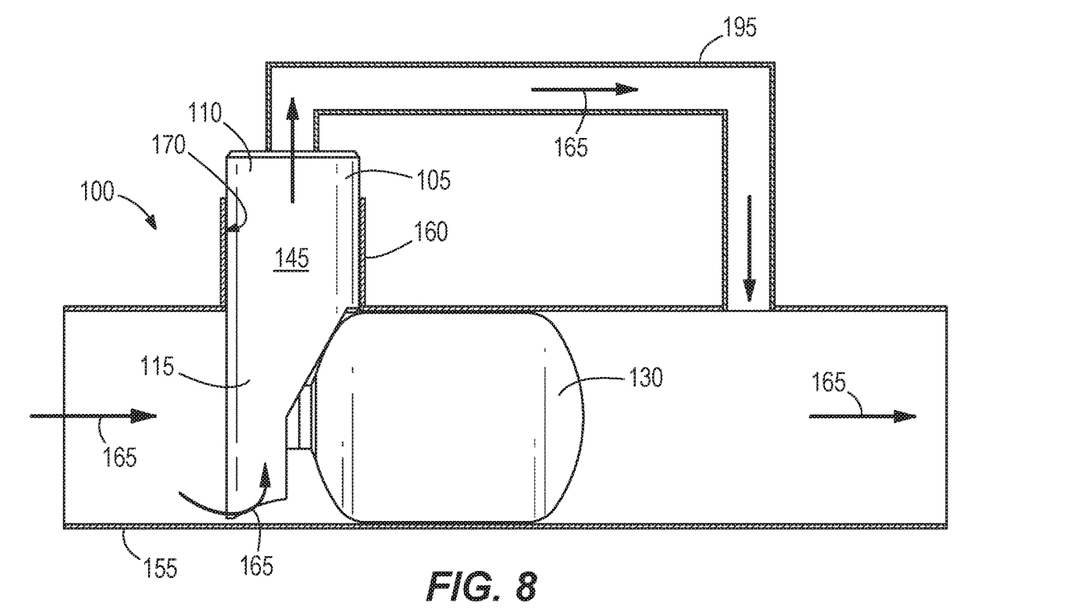
FIG. 8 is a side elevation view of the fluid restriction system of FIG. 1 connected to a conduit for carrying fluid flow out and around the inflatable plug.

As best shown in FIG. 9, a fluid flow bypass passage 190 is defined in the alignment body 110 and the shield body 115. The fluid flow bypass passage 190 may simply be the hollow interior of the alignment body 110 and the shield body 115 that is not already occupied by the first and second fluid passages 140, 142. Other embodiments may include the fluid flow bypass passage 190 comprising one or more dedicated pipes, pathways, tubes, or the like. As shown in FIG. 8, at least a portion of the fluid flow 165 may go around the shield body 115 via the one or more gaps 185 and enter the fluid flow bypass passage 190. This fluid flow 165 may then move upwardly through the anchor 105 and out the top of the anchor.

In some embodiments, as shown in FIG. 8, the fluid flow 165 may be redirected around the inflatable plug 130 in a selective manner. That is to say that a conduit 195 may be connected to the alignment body 110. The conduit 195 may be in fluid communication with the fluid flow bypass passage 190 such that the conduit and the fluid flow bypass passage can carry at least some of the fluid flow 165 from upstream of the inflatable plug 130 to a position downstream of the inflatable plug 130 without passing by the inflatable plug in the pipe 155. As stated above, this bypass route for the fluid flow 165 may be selectively opened and closed with, for instance, a valve such as a ball valve, or the like.

With the shield body 115 partially or completely blocking the fluid flow 165, and with some embodiments redirecting at least a portion of the fluid flow, it is contemplated in this disclosure that the shield body 115 and inflatable plug 130 are insertable into the pipe 155 without first closing a valve (such as a ball valve) at a point upstream of the insertion point. The flow restriction system 100 of the current disclosure may even be placed into a pressurized pipeline 155 that carries significant flows therein. It is further contemplated in this disclosure that the flow restriction system 100 could even be installable in pipes 155 in situations where other inflatable plug assemblies simply could not (at least not without first closing an upstream valve). The tap hole for plug insertion is smaller than other systems for blocking a pressurized pipeline such as a mechanical or folding head line stop.

In use, a worker inserts at least a portion of the anchor 105 in the pipe 155 to thereby produce a pressure differential in the fluid flow 165 through the pipe 155. Particularly, at least the shield body 115 of the anchor 105 projects into the fluid flow 165 of the pipe 155. The worker can insert the anchor 105 through a hot tap sleeve 160, for instance. Next, the worker inflates the inflatable plug 130, which is connected to the anchor 105 and disposed in the pipe 155 downstream from the shield body 115. Once the inflatable plug 130 has been sufficiently inflated with, for instance, air, the pipe 155 is sealed. The worker can then fill the inflatable plug 130 with, for instance, water. The introduction of the water can force out the air that is already present in the inflatable plug 130 until at least a portion of the air is replaced with water. During this process, some of the fluid flow 165 can be optionally routed through a fluid flow bypass passage 190 to further reduce the influence of the fluid flow 165 on the inflatable plug 130 while the inflatable plug 130 is being inflated.

Various features and advantages of the disclosure are set forth in the following claims.

What is claimed is:

1. A flow restriction system for restricting fluid flow through a pipe, the flow restriction system comprising:
    an anchor including:
        an alignment body,
        a shield body extending from the alignment body, the shield body having an upstream face and a downstream face opposite the upstream face, the shield body configured to block at least a portion of the fluid flow through the pipe, the shield body configured to be the most upstream portion of the flow restriction system in the pipe, the shield body including a shield body width configured to extend perpendicularly to a length of the pipe, and
        a first fluid passage defined in the alignment body and the shield body;
    an inflatable plug coupled to the downstream face of the shield body, the inflatable plug including an interior chamber, the interior chamber in fluid communication with the first fluid passage, the inflatable plug including a plug diameter in an inflated state; and
    wherein the shield body width is shorter than the plug diameter and is longer than half of the plug diameter.

2. The flow restriction system of claim 1, wherein the upstream face of the shield body is curved to deflect fluid flow around the shield body.

3. The flow restriction system of claim 1, wherein at least a portion of the downstream face of the shield body is flat.

4. The flow restriction system of claim 1, further comprising a fluid flow bypass passage defined in the alignment body and the shield body, the fluid flow bypass passage configured to receive fluid flow from upstream of the anchor.

5. The flow restriction system of claim 4, further comprising a conduit connected to the alignment body and in fluid communication with the fluid flow bypass passage, the fluid flow bypass passage and the conduit configured to carry fluid flow from upstream of the inflatable plug, out of the pipe and around the inflatable plug, to downstream of the inflatable plug.

6. The flow restriction system of claim 1, wherein
the inflatable plug changes from an uninflated state to the inflated state;
at least one band is wrapped around both the shield body and the inflatable plug in the uninflated state; and
wherein the at least one band breaks or releases as the inflatable plug changes to the inflated state.

7. The flow restriction system of claim 1, further comprising
a hot tap sleeve configured to couple to the pipe; and
wherein the anchor and inflatable plug are together insertable through the hot tap sleeve to move the shield body and the inflatable plug into the pipe.

8. The flow restriction system of claim 7, wherein
the hot tap sleeve includes an inner wall surface; and
the alignment body includes a peripheral surface generally parallel to the inner wall surface.

9. The flow restriction system of claim 8, wherein the shield body and the inflatable plug in an uninflated state generally fit within a footprint of the alignment body, the footprint defined by a peripheral surface of the alignment body.

10. The flow restriction system of claim 1, wherein the shield body and the inflatable plug are configured to be inserted into the pipe without first stopping the flow in the pipe.

11. The flow restriction system of claim 1, further comprising
a second fluid passage defined in the alignment body and the shield body, the interior chamber of the inflatable plug in fluid communication with the second fluid passage.

12. The flow restriction system of claim 11, wherein
each of the first fluid passage and the second fluid passage is in selective fluid communication with the interior chamber of the inflatable plug;
the first fluid passage is configured to carry a first fluid into and out of the interior chamber of the inflatable plug; and
the second fluid passage is configured to carry a second fluid into and out of the interior chamber of the inflatable plug.

13. The flow restriction system of claim 12, further comprising
a first fluid tube disposed in the interior chamber of the inflatable plug, the first fluid tube in fluid communication with the first fluid passage;
a second fluid tube disposed in the interior chamber of the inflatable plug, the second fluid tube in fluid communication with the second fluid passage;
a float coupled to the first fluid tube, the float having a density that is less than a density of the second fluid;
a weight coupled to the second fluid tube, the weight having a density that is greater than the density of the second fluid.

14. A method of restricting fluid flow through a pipe, the method comprising:
inserting a rigid, non-inflatable shield body of an anchor into the pipe, thereby producing a pressure differential in the fluid flow through the pipe with the shield body forming a most upstream portion of the anchor, the shield body including a shield body width extending across a majority of an inner diameter of the pipe; and
inflating an inflatable plug connected to the anchor downstream from the shield body to seal the pipe, such that a diameter of the inflatable plug in an inflated state is substantially equal to the inner diameter of the pipe.

15. The method of claim 14, wherein the inserting step includes inserting the shield body and the inflatable plug into the pipe together with the inflatable plug in an uninflated state.

16. The method of claim 15, wherein the inserting step includes inserting the shield body and the inflatable plug together into the pipe through a hot tap sleeve coupled to the pipe.

17. The method of claim 14, further comprising
routing at least a portion of the fluid flow through a fluid flow bypass passage, the fluid flow bypass passage passing the fluid flow through the anchor, out of the pipe, and back into the pipe downstream of the inflatable plug.

18. The method of claim 14, further comprising
wherein the inflating step includes inflating the inflatable plug with a first fluid having a first fluid density;
filling the inflatable plug with a second fluid having a second fluid density that is greater than the first fluid density;
exhausting the first fluid from the inflatable plug as the second fluid fills the inflatable plug.

19. The method of claim 14, wherein the inserting step occurs with the fluid flow moving generally unobstructed through the pipe upstream of an insertion point of the shield body.

* * * * *